United States Patent
Miki et al.

(10) Patent No.: US 11,267,455 B2
(45) Date of Patent: Mar. 8, 2022

(54) VEHICLE CONTROL DEVICE

(71) Applicant: HONDA MOTOR CO., LTD., Tokyo (JP)

(72) Inventors: Haruhiko Miki, Saitama (JP); Hiroshi Saito, Saitama (JP); Masashi Eto, Saitama (JP); Yusuke Sasaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 313 days.

(21) Appl. No.: 16/627,219

(22) PCT Filed: Jun. 30, 2017

(86) PCT No.: PCT/JP2017/024252
§ 371 (c)(1),
(2) Date: Dec. 27, 2019

(87) PCT Pub. No.: WO2019/003443
PCT Pub. Date: Jan. 3, 2019

(65) Prior Publication Data
US 2020/0122712 A1    Apr. 23, 2020

(51) Int. Cl.
*B60W 20/20*   (2016.01)
*B60L 50/15*   (2019.01)
(Continued)

(52) U.S. Cl.
CPC ............ *B60W 20/20* (2013.01); *B60L 50/15* (2019.02); *B60L 50/40* (2019.02); *B60W 10/06* (2013.01);
(Continued)

(58) Field of Classification Search
CPC combination set(s) only.
See application file for complete search history.

(56) References Cited

U.S. PATENT DOCUMENTS

2008/0022686 A1* 1/2008 Amdall ............... B60W 10/08
                                                            60/716
2012/0191280 A1   7/2012 Ohno
(Continued)

FOREIGN PATENT DOCUMENTS

JP    H11-346402 A    12/1999
JP    2004-125072 A    4/2004
(Continued)

OTHER PUBLICATIONS

May 11, 2021, Japanese Office Action issued for related JP application No. 2020-114618.
(Continued)

*Primary Examiner* — George C Jin
(74) *Attorney, Agent, or Firm* — Paratus Law Group, PLLC

(57) ABSTRACT

A vehicle control device having a prime mover, a first rotating member which is rotated by power of the prime mover, and a second rotating member which is connected to the first rotating member and which rotate a drive wheel, includes a deriving unit which derive a prime mover request output that is an output requested by the prime mover in accordance with a request output to the drive wheel, and a control unit which increase or decrease a rotation speed of the prime mover between a lower limit rotation speed and an upper limit rotation speed in accordance with a change in a rotation speed of the drive wheel. The control unit increases or decreases the rotation speed of the prime mover without changing a power output by the prime mover or an output of the first rotating member in accordance with the prime mover request output.

21 Claims, 12 Drawing Sheets

(51) Int. Cl.
    *B60L 50/40*     (2019.01)
    *B60W 10/06*     (2006.01)
    *B60W 10/08*     (2006.01)
    *F02D 41/04*     (2006.01)
    *B60L 53/22*     (2019.01)

(52) U.S. Cl.
    CPC ............ *B60W 10/08* (2013.01); *F02D 41/04* (2013.01); *B60L 53/22* (2019.02); *B60W 2720/28* (2013.01); *F02D 2200/101* (2013.01); *F02D 2200/501* (2013.01)

(56) References Cited

U.S. PATENT DOCUMENTS

| | | | |
|---|---|---|---|
| 2014/0195137 A1 | 7/2014 | Fischer | |
| 2016/0082826 A1* | 3/2016 | Aoki | B60W 10/08 180/65.23 |
| 2016/0121742 A1* | 5/2016 | Cho | B60L 53/24 701/22 |
| 2016/0257299 A1 | 9/2016 | Ikedaya et al. | |

FOREIGN PATENT DOCUMENTS

| | | |
|---|---|---|
| JP | 2004-243884 | 9/2004 |
| JP | 2009-210045 A | 9/2009 |
| JP | 2010-173389 A | 8/2010 |
| JP | 2012-148732 A | 8/2012 |
| JP | 2014-519432 A | 8/2014 |
| JP | 2015-166221 A | 9/2015 |
| JP | 2016-068799 A | 5/2016 |
| JP | 2016-159858 A | 9/2016 |

OTHER PUBLICATIONS

Oct. 3, 2017, International Search Report issued for related PCT Application No. PCT/JP2017/024252.
Oct. 3, 2017, International Search Opinion issued for related PCT Application No. PCT/JP2017/024252.

* cited by examiner

<SERIES TRAVEL MODE>

<ENGINE TRAVEL MODE>

VEHICLE CONTROL DEVICE

CROSS REFERENCE TO PRIOR APPLICATION

This application is a National Stage Patent Application of PCT International Patent Application No. PCT/JP2017/024252 (filed on June 30, 2017) under 35 U.S.C. § 371, which is hereby incorporated by reference in its entirety.

TECHNICAL FIELD

The present invention relates to a vehicle control device.

BACKGROUND ART

A hybrid vehicle of a series mode travels on a power of a motor generator. The engine is mainly used for power generation, and electric power generated in another motor generator by a power of the engine is supplied to the motor generator. Therefore, when power generation is required, by steadily operating the engine at an operating point at which efficiency is highest, fuel consumption is improved. However, even when an accelerator pedal operation by a driver or a travel speed of the vehicle changes, an operation noise of the steadily operated engine does not change. A driver who is familiar with a vehicle having an engine and a speed changer will feel uncomfortable about this, and marketability of the vehicle is not highly expected. Therefore, even in a case of a hybrid vehicle of the series mode, a vehicle that is capable of achieving a natural feeling of a driver and has high marketability is desired.

A series hybrid vehicle described in Patent Literature 1 determines a target engine rotation speed simulating a speed changer based on an operation amount indicating an acceleration/deceleration intention of a driver (at least one of an accelerator operation amount and a vehicle speed). Therefore, a driver of the series hybrid vehicle can experience the same engine rotation speed fluctuation as that of a vehicle having an engine and a speed changer.

A hybrid vehicle described in Patent Literature 2 determines a target engine Output to a value that increases stepwise with respect to the vehicle speed. The target engine output is corrected in accordance with a remaining capacity of a battery. According to the hybrid vehicle, it is possible to drive the engine without giving an uncomfortable feeling to an occupant.

CITATION LIST

Patent Literature

Patent Literature 1: JP-A-2010-173389
Patent Literature 2: JP-A-2015-166221

SUMMARY OF INVENTION

Technical Problem

The above series hybrid vehicle described in Patent Literature 1 determines the target engine rotation speed based on the operation amount indicating the acceleration/deceleration intention of the driver. In the hybrid vehicle, an engine torque is controlled based on a target engine torque obtained by dividing a target power generation output with the target engine rotation speed, and a generator rotation speed is controlled based on the target engine rotation speed. However, since the target engine rotation speed is uniquely determined based on the operation amount, a high degree of freedom cannot be expected in control of the engine and the generator. If the degree of freedom of control is limited, it is difficult to achieve both improvement of energy efficiency and improvement of marketability.

In the hybrid vehicle described in Patent Literature 2, a target value of a rotation speed of a travel motor is calculated based on an accelerator opening degree and the vehicle speed. After a basic target engine output is determined in accordance with the vehicle speed, the basic target engine output is corrected based on the remaining capacity of the battery and is determined as a final target engine output. Components of the engine are controlled so that the output of the engine becomes the final target engine output, and the generator is driven by the engine. If the vehicle speed is high, a power generation amount of the generator increases, but if the accelerator opening degree at this time is low, the travel motor cannot consume generated power of the generator, and surplus power is charged to the battery. In contrast, if the vehicle speed is low, the power generation amount of the generator decreases, but if the accelerator opening degree at this time is high, the generated power of the generator alone is insufficient as electric power required by the travel motor, and the electric power is required to provide a shortage electric power to the travel motor. In this way, if the electric power required by the travel motor does not coincide with the power generation amount of the generator, and the surplus or shortage of power is charged to or discharged from the battery, improvement of the energy efficiency cannot be expected due to energy loss caused by power conversion between the generator and the battery or power conversion between the battery and the travel motor.

An object of the present invention is to provide a vehicle control device capable of achieving both improvement of marketability and improvement of energy efficiency.

Solution to Problem

In order to achieve the above object, a first aspect is:
a vehicle control device (for example, an ECU 107 in an embodiment described later) having a prime mover (for example, an engine ENG in the embodiment described below), a first rotating member configured to be rotated by power of the prime mover (for example, a first motor generator MG1, an input disk 21 or a driven pulley of a continuously variable speed changer CVT in the embodiment described later), and a second rotating member connected to the first rotating member and configured to rotate a drive wheel (for example, a second motor generator MG2, an output disk 22 or a drive pulley of the continuously variable speed changer CVT in the embodiment described later),
in which the vehicle control device includes:
a deriving unit configured to derive a prime mover request output that is an output requested by the prime mover in accordance with a request output to the drive wheel (for example, an engine request output calculation unit 154 in the embodiment to be described later); and
a control unit configured to increase or decrease a rotation speed of the prime mover between a lower limit rotation speed and an upper limit rotation speed in accordance with a change in a rotation speed of the drive wheel (for example, an engine rotation speed setting unit 155, a first inverter control unit 156, an engine torque setting unit 157, and an engine control unit 158 in the embodiment described later), and in which the control unit is configured to increase or decrease the rotation speed of the prime mover without changing a power output by the prime mover or an output of the first rotating member in accordance with the prime mover request output.

A second aspect provides the vehicle control device according to the first aspect, in which the control unit is configured to increase the rotation speed of the prime mover as the rotation speed of the drive wheel increases.

A third aspect provides the vehicle control device according to the second aspect, in which the control unit is configured to determine an increase rate of the rotation speed of the prime mover with respect to the rotation speed of the drive wheel based on the lower limit rotation speed and the rotation speed of the drive wheel.

A fourth aspect provides the vehicle control device according to the third aspect, in which the increase ratio is equal to a slope of a line segment connecting an intersection of the rotation speed of the drive wheel and the lower limit rotation speed and an intercept on an axis of the rotation speed of the prime mover on a coordinate represented by the rotation speed of the prime mover and the rotation speed of the drive wheel.

A fifth aspect provides the vehicle control device according to the fourth aspect, in which the intercept is set in accordance with a difference between the upper limit rotation speed and the lower limit rotation speed.

A sixth aspect provides the vehicle control device according to the fifth aspect, in which the intercept is set to zero when the difference is equal to or greater than a first predetermined value.

A seventh aspect provides the vehicle control device according to the fifth or sixth aspect, in which the intercept is set to a larger value as the difference is smaller.

An eighth aspect provides the vehicle control device according to any one of the fifth to seventh aspects, in which the intercept is set to the upper limit rotation speed when the difference is equal to or smaller than a second predetermined value.

A ninth aspect provides the vehicle control device according to any one of the first to eighth aspects, in which when the rotation speed of the prime mover reaches the upper limit rotation speed, the control unit decreases a target rotation speed of the prime mover to a predetermined value between the lower limit rotation speed and the upper limit rotation speed.

A tenth aspect provides the vehicle control device according to the ninth aspect, in which the predetermined value is the lower limit rotation speed.

An eleventh aspect provides the vehicle control device according to any one of the first to tenth aspects, in which when the difference between the lower limit rotation speed and the upper limit rotation speed is equal to or smaller than a predetermined value, the control unit prohibits a decrease in the rotation speed of the prime mover.

A twelfth aspect provides the vehicle control device according to any one of the first to eleventh aspects, in which when a difference between the rotation speed of the prime mover and the lower limit rotation speed is equal to or greater than a predetermined value before the rotation speed of the prime mover reaches the upper limit rotation speed, the control unit reduces the target rotation speed of the prime mover to the lower limit rotation speed.

A thirteenth aspect provides the vehicle control device according to any one of the second to twelfth aspects, in which when the rotation speed of the drive wheel increases, in a case where the increase rate of the rotation speed of the prime mover with respect to the rotation speed of the drive wheel is lower than an increase rate of the lower limit rotation speed, the control unit increases the rotation speed of the prime mover in accordance with the lower limit rotation speed after the rotation speed of the prime mover becomes equal to the lower limit rotation speed.

A fourteenth aspect provides the vehicle control device according to any one of the first to thirteenth aspects, in which the control unit is configured to:
set the lower limit rotation speed in accordance with the request output, and
when the lower limit rotation speed is to be decreased in accordance with a decrease in the request output, set a decrease rate of the lower limit rotation speed equal to or smaller than a predetermined value.

A fifteenth aspect provides the vehicle control device according to any one of the first to fourteenth aspects, in which the control unit sets the upper limit rotation speed in accordance with the rotation speed of the drive wheel.

A sixteenth aspect provides the vehicle control device according to the fifteenth aspect, in which when the upper limit rotation speed is to be decreased in accordance with a decrease in the rotation speed of the drive wheel, the control unit sets a decrease rate of the upper limit rotation speed equal to or smaller than a predetermined value.

A seventeenth aspect provides the vehicle control device according to any one of the ninth to sixteenth aspects, in which in a case where the rotation speed of the prime mover has reached the upper limit rotation speed and thus the target rotation speed of the prime mover is to be decreased, the control unit decreases the target rotation speed after a predetermined time has elapsed since a previous decrease of the target rotation speed.

An eighteenth aspect provides the vehicle control device according to any one of the first to seventeenth aspects, in which when the request output is equal to or greater than a predetermined value or the rotation speed of the drive wheel is equal to or greater than a predetermined value, the control unit increases or decreases the rotation speed of the prime mover between the lower limit rotation speed and the upper limit rotation speed.

A nineteenth aspect provides the vehicle control device according to any one of the first to eighteenth aspects, in which the first rotating member is a generator (for example, a first motor generator MG1 in the embodiment described later) and the second rotating member is an electric motor (for example, a second motor generator MG2 in the embodiment described later).

A twentieth aspect provides the vehicle control device according to the nineteenth aspect, in which the vehicle includes a capacitor capable of supplying electric power to the second rotating member and charging electric power generated by the first rotating member (for example, a battery BAT in the embodiment described later), and in which the control unit sets the lower limit rotation speed to be lower as a remaining capacity of the capacitor is higher.

A twenty first aspect provides the vehicle control device according to any one of the first to eighteenth aspects, in which the first rotating member is an input-side member of a continuously variable speed changer (for example, the input disk 21 or the driven pulley of the continuously variable speed changer CVT in the embodiment described later), and the second rotating member is an output-side member of the continuously variable speed changer (for example, the output disk 22 or the drive pulley of the continuously variable speed changer CVT in the embodiment described later).

Advantageous Effects of Invention

According to the first aspect, by increasing or decreasing a rotation speed of the prime mover between a lower limit rotation speed and an upper limit rotation speed in accordance with a change in a rotation speed of the drive wheel, the operation noise of the prime mover varies according to the rotation speed of the drive wheel. Therefore, the driver can obtain a natural feeling in which the vehicle speed (the rotation speed of the drive wheel) and the operation noise of the prime mover are in conjunction with each other, thereby improving marketability of the vehicle. Further, since the power of the prime mover or the output of the first rotating member that achieves an efficiency suitable for the request output is not changed even when the rotation speed of the prime mover is increased or decreased, energy can be supplied to the second rotating member without surplus or shortage. As a result, unnecessary energy conversion or the like is not generated, and thus energy efficiency is improved. As described above, it is possible to achieve both improvement of marketability of the vehicle and improvement of energy efficiency.

According to the second aspect, the rotation speed of the prime mover increases as the rotation speed of the drive wheel increases, so that the driver can obtain a natural feeling in which the vehicle speed (the rotation speed of the drive wheel) and the operation noise of the prime mover are in conjunction with each other.

According to the third and fourth aspects, since the same operation noise as that of a vehicle having an engine and a speed changer can be generated when the vehicle speed is increased, marketability of the vehicle can be improved.

According to the fifth to eighth aspects, it is possible to prevent frequent increase and decrease of the rotation speed of the prime mover, According to the ninth aspect, the rotation speed of the prime mover can be increased or decreased by decreasing the target rotation speed of the prime mover.

According to the tenth aspect, the rotation speed of the prime mover can be increased again by decreasing the target rotation speed of the prime mover to the lower limit rotation speed.

When a difference between a lower limit rotation speed NEl and an upper limit rotation speed NEh is small, even when the target rotation speed is increased or decreased, the change is felt as a slight variation in the rotation speed, that is, a failure of the prime mover, without being recognized as a change in the rotation speed due to the simulated gear shift, whereas according to the eleventh aspect, if the difference between the lower limit rotation speed and the upper limit rotation speed is lower than a predetermined value, the rotation speed of the prime mover is prohibited from decreasing, so that misunderstanding as a failure of the prime mover can be prevented.

According to the twelfth aspect, a drop when decreasing the rotation speed of the prime mover can be suppressed to a predetermined value smaller than the difference between the lower limit rotation speed and the upper limit rotation speed. Thereby, a large change in the operation noise of the prime mover can be prevented.

According to the thirteenth aspect, even in a case where the increase rate of the rotation speed of the prime mover with respect to the rotation speed of the drive wheel is lower than the increase rate of the lower limit rotation speed, the rotation speed of the prime mover is increased in accordance with the lower limit rotation speed. Therefore, the rotation speed of the prime mover does not fall below the lower limit rotation speed, and the power of the prime mover or the output of the first rotating member can be prevented from decreasing.

According to the fourteenth aspect, by setting the decrease rate of the lower limit rotation speed to a value equal to or smaller than the predetermined value without depending on the degree of decrease in the request output, it is possible to prevent a rapid increase or decrease in the rotation speed of the prime mover. As a result, marketability of the vehicle can be improved.

According to the fifteenth aspect, since a noise level rises and a higher upper limit rotation speed can be allowed as the rotation speed of the drive wheel rises, deterioration in marketability due to increase in the operation noise of the prime mover can be prevented.

According to the sixteenth aspect, by setting the decrease rate of the upper limit rotation speed to a value equal to or smaller than the predetermined value without depending on the degree of decrease in the rotation speed of the drive wheel, it is possible to prevent a rapid increase or decrease in the rotation speed of the prime mover. As a result, marketability of the vehicle can be improved.

According to the seventeenth aspect, it is possible to prevent frequent increase or decrease in the rotation speed of the prime mover, and it is possible to prevent a decrease in the rotation speed of the prime mover when the request output is decreased temporarily. As a result, responsiveness of the prime mover at the time of re-acceleration can be prevented from deteriorating.

According to the eighteenth aspect, when the request output is equal to or greater than a predetermined value or the rotation speed of the drive wheel is equal to or greater than a predetermined value, by increasing or decreasing the rotation speed of the prime mover without changing a power output by the prime mover or an output of the first rotating member in accordance with the request output, energy efficiency and marketability of the vehicle can be obtained sufficiently.

According to the nineteenth aspect, it is possible to achieve both improvement of marketability of the vehicle and improvement of energy efficiency in a hybrid vehicle capable of energy transfer of the series mode.

According to the twentieth aspect, if the lower limit rotation speed is set to be lower as the remaining capacity of the capacitor is higher, a possibility that the generator as the first rotating member generates power decreases, and it is possible to increase a possibility that the power of the capacitor having a high remaining capacity is used.

According to the twenty-first aspect, it is possible to achieve both improvement of marketability of the vehicle and improvement of energy efficiency in a vehicle having a prime mover and a continuously variable speed changer.

DESCRIPTION OF EMBODIMENTS

Hereinafter, embodiments of the present invention will be described with reference to the drawings, A hybrid electrical vehicle (HEV) includes a motor generator and an engine, and travels on a power of the motor generator and/or the engine in accordance with a travel state of the vehicle. The REV is roughly classified into two types: a series mode and a parallel mode. An HEV of the series mode travels on the power of the motor generator. The engine is mainly used for power generation, and electric power generated in another motor generator by a power of the engine is charged to a battery or supplied to the motor generator. On the other hand, an HEV of the parallel mode travels on the power of either one or both of the motor generator and the engine. An HEV capable of switching between these two modes are known as well. In an HEV of this type, a power transmission system is switched to a configuration of either one of the series mode and the parallel mode by engaging or disengaging (connecting and disconnecting) a clutch in accordance with the travel state.

Figure 1:
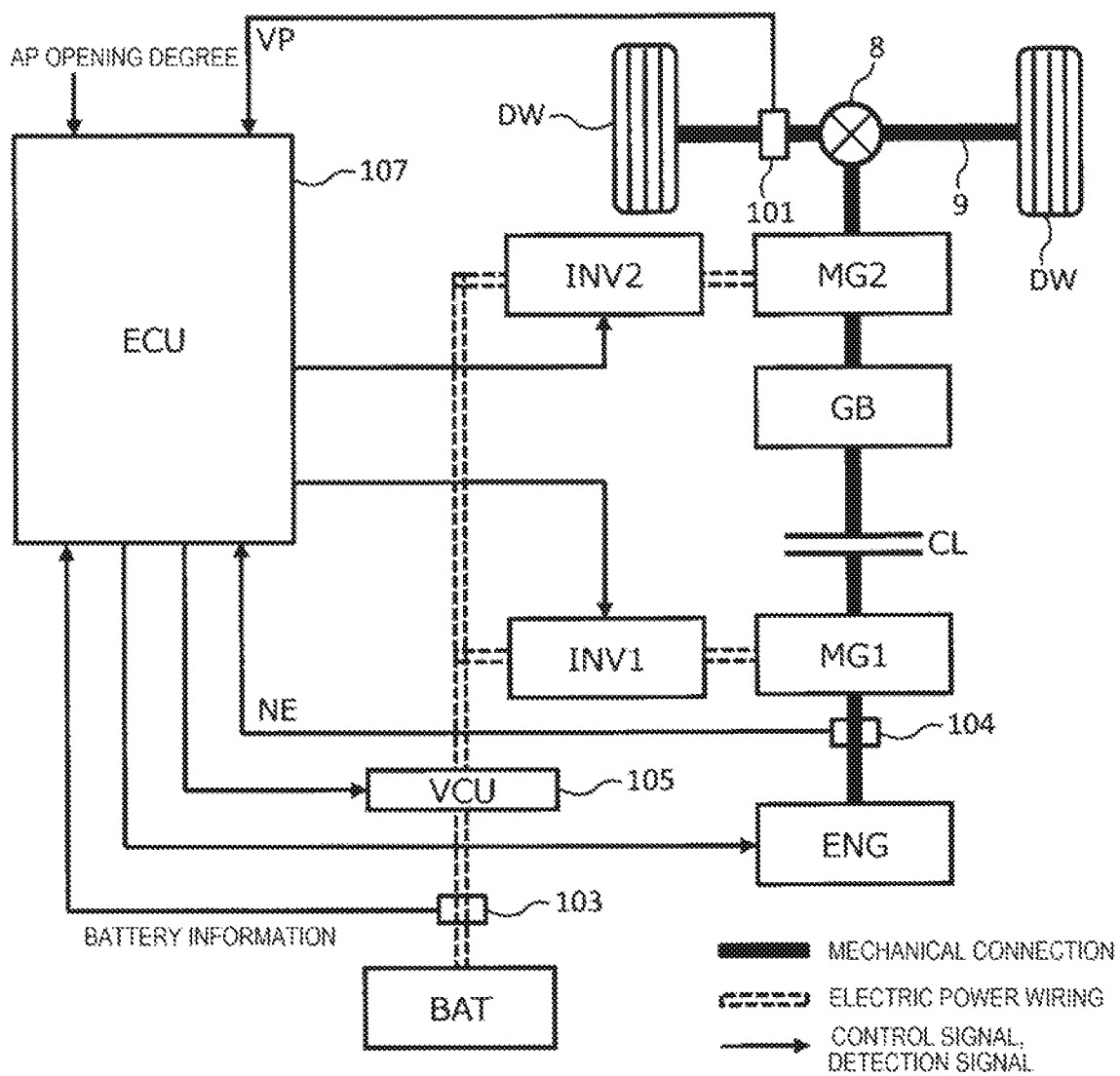
FIG. 1 is a block diagram showing an internal configuration of an HEY (vehicle) capable of switching between a series mode and a parallel mode.

FIG. 1 is a block diagram showing an internal configuration of an HEV capable of switching between a series mode and a parallel mode. The HEV (hereinafter, simply referred to as "vehicle") shown in FIG. 1 includes: an engine ENG as an example of a prime mover that outputs rotating power; a first motor generator MG1; a second motor generator MG2; a lockup clutch (hereinafter, simply referred to as "clutch") CL; a gear box (hereinafter, simply referred to as "gear") GB; a vehicle speed sensor 101; a battery sensor 103; a rotation speed sensor 104; a battery BAT; a voltage control unit (VCU) 105; a first inverter INV1; a second inverter INV2; and an electronic control unit (ECU) 107. In FIG. 1, a thick solid line indicates a mechanical connection, a double dotted line indicates electric power wiring, and an arrow with a thin solid line indicates a control signal or a detection signal.

The engine ENG drives the first motor generator MG1 as a generator in a state in which the clutch CL is disengaged. However, if the clutch CL is engaged, the power output from the engine ENG is transmitted as mechanical energy for the vehicle to travel to drive wheels DW, DW via the first motor generator MG1, the clutch CL, the gear GB, the second motor generator MG2, a differential gear 8, and a drive shaft 9.

The first motor generator MG1 is driven by the power of the engine ENG to generate electric power. The first motor generator MG1 may operate as an electric motor when braking the vehicle.

A rotor of the second motor generator MG2 operates as an electric motor due to electric power supplied from at least one of the battery BAT and the first motor generator MG1, and generates power for the vehicle to travel. A torque generated by the second motor generator MG2 is transmitted to the drive wheels DW, DW via the differential gear 8 and the drive shaft 9. The second motor generator MG2 may operate as a generator when braking the vehicle.

The clutch CL engages or disengages (connects or disconnects) a power transmission path from the engine ENG to the drive wheels DW, DW in accordance with an instruction from the ECU 107. When the clutch CL is in the disengaged state, the power output from the engine ENG is not transmitted to the drive wheels DW, DW, and when the clutch CL is in the connected state, the power output from the engine ENG is transmitted to the drive wheels DW, DW. The gear GB includes a shift stage or a fixed stage, and transmits power from the engine ENG to the drive wheels DW at a predetermined gear ratio. The gear ratio in the gear GB is changed in accordance with an instruction from the ECU 107.

The battery BAT has a plurality of power storage cells connected in series, and supplies a high voltage of, for example, 100 to 200 V. The power storage cells are, for example, lithium ion batteries or nickel hydrogen batteries.

The vehicle speed sensor 101 detects a travel speed (vehicle speed VP) of the vehicle. The vehicle speed VP linearly corresponds to a rotation speed of the drive wheels DW, DW. A signal indicating the vehicle speed VP detected by the vehicle speed sensor 101 is sent to the ECU 107, The battery sensor 103 detects output (terminal voltage and charge/discharge current) of the battery BAT. A signal indicating the terminal voltage, the charge/discharge current, and the like detected by the battery sensor 103 is sent to the ECU 107 as battery information.

The rotation speed sensor 104 detects a rotation speed NE of the engine ENG. A signal indicating the rotation speed NE detected by the rotation speed sensor 104 is sent to the ECU 107. The VCU 105 steps up an output voltage of the battery BAT when the second motor generator MG2 operates as an electric motor. Moreover, the VCU 105 steps down the output voltage of the second motor generator MG2 in a case where regenerative electric power, which is generated by the second motor generator MG2 and converted to DC, is charged to the battery BAT when braking the vehicle. Further, the VCU 105 steps down the electric power generated by the first motor generator MG1 due to driving of the engine ENG and converted into DC. The power stepped down by the VCU 105 is charged to the battery BAT.

Figure 2:
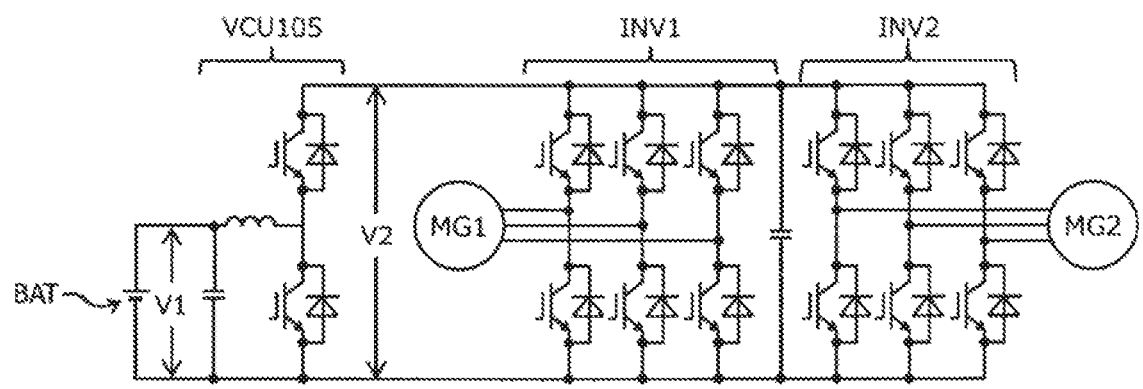
FIG. 2 is an electric circuit diagram showing a relationship between a battery, a VCU, a first inverter, a second inverter, a first motor generator, and a second motor generator.

FIG. 2 is an electric circuit diagram showing a relationship between the battery BAT, the VCU 105, a first inverter INV1, a second inverter INV2, the first motor generator MG1, and the second motor generator MG2. As shown in FIG. 2, the VCU 105 switches on and off two switching elements using a V1 voltage output from the battery BAT as an input voltage, so as to step up a V2 voltage on an output side to a voltage higher than the V1 voltage. The V2 voltage when the two switching elements of the VCU 105 are not switched on and off is equal to the V1 voltage.

The first inverter INV1 converts an AC voltage generated by the first motor generator MG1 due to driving of the engine ENG into a DC voltage. The first inverter INV1 converts a DC voltage generated by the second motor generator MG2 when braking the vehicle and converted by the second inverter INV2 into an AC voltage, and supplies a three-phase current to the first motor generator MG1. The second inverter INV2 converts a DC voltage into an AC voltage and supplies a three-phase current to the second motor generator MG2. The second inverter INV2 converts an AC voltage generated by the second motor generator MG2 when braking the vehicle into a DC voltage.

The ECU 107 performs drive control of the engine ENG, output control of the first motor generator MG1 via control of the first inverter INV1, connection/disconnection control of the clutch CI, and output control of the second motor generator MG2 via control of the second inverter INV2. A signal indicating an accelerator pedal opening degree (AP opening degree) according to an accelerator pedal operation by a driver of the vehicle, a signal indicating a vehicle speed VP from the vehicle speed sensor 101, and the like are input to the ECU 107. The ECU 107 selects a travel anode of the vehicle, which will be described later, based on the AP opening degree and the vehicle speed VP, and controls the state of the clutch CL and the output of the engine ENG, the first motor generator MG1, and the second motor generator MG2.

(Vehicle Travel Mode)

The vehicle according to the present embodiment travels in one of an "EV travel mode", a "series travel mode", and an "engine travel mode" in which a form of using driving sources including the engine ENG, the first motor generator MG1, and the second motor generator MG2 is different from one another.

Figure 3:
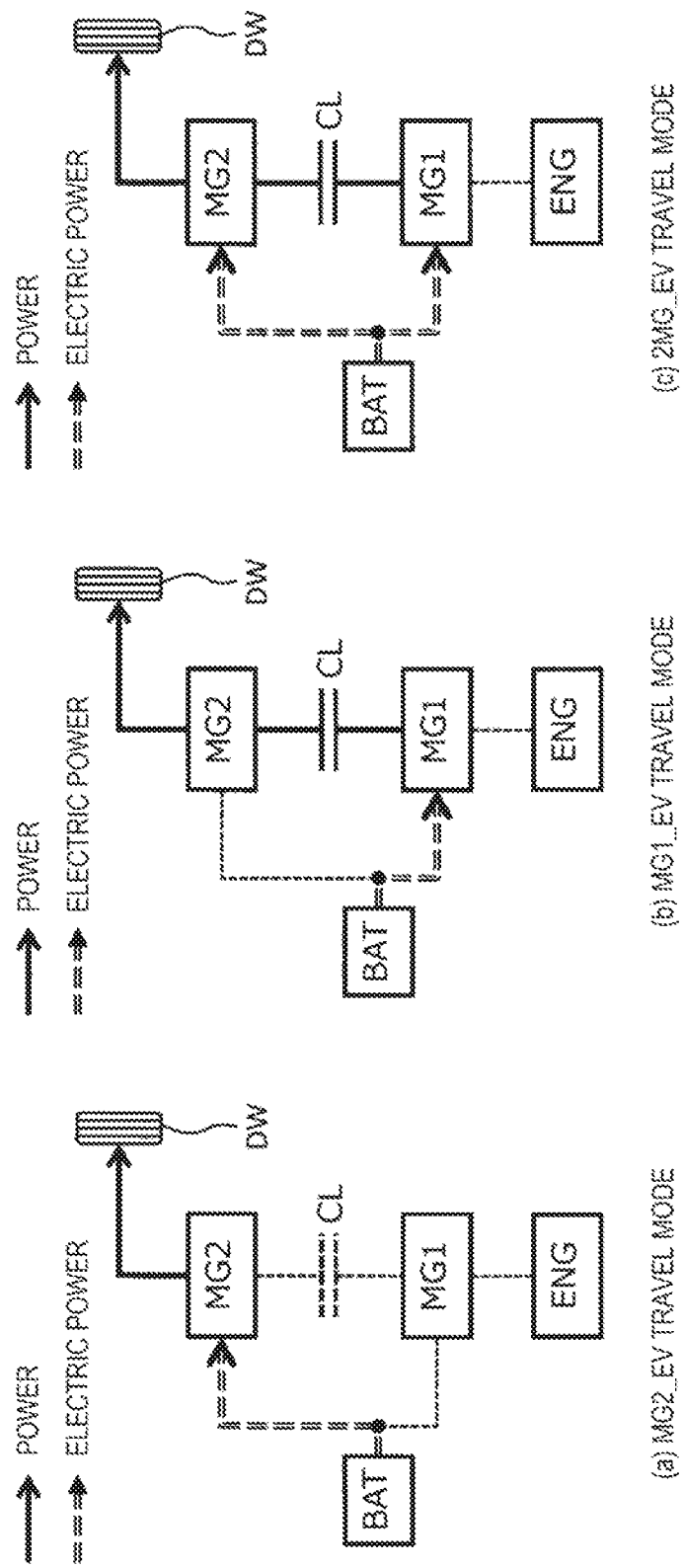
FIG. 3 is a diagram showing transmission of power and electric power in a case of being set to an EV travel mode.
Figure 4:
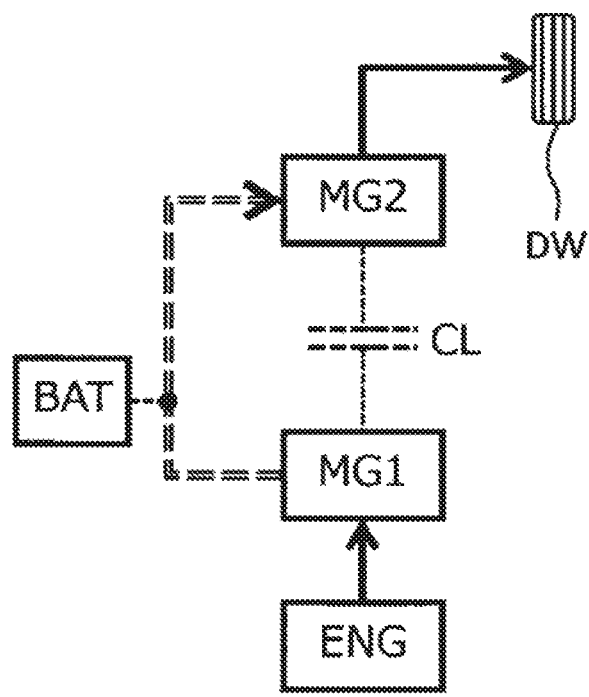
FIG. 4 is a diagram showing transmission of power and electric power in a case of being set to a series travel mode.
Figure 5:
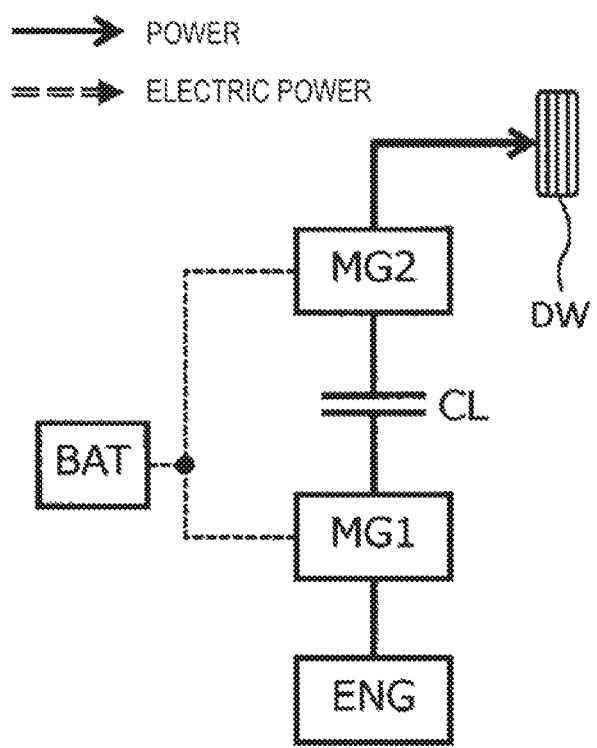
FIG. 5 is a diagram showing transmission of power and electric power in a case of being set to an engine travel mode.

When the vehicle travels in the EV travel mode, as shown in FIG. 3, the vehicle travels on the power from the first motor generator MG1 and/or the second motor generator MG2. When the vehicle travels in the series travel mode, as shown in FIG. 4, the clutch CL is disengaged, and the vehicle travels on the power from the first motor generator MG1. In the series travel mode, the electric power generated by the first motor generator MG1 due to operation of the engine ENG is supplied to the second motor generator MG2 so that the second motor generator MG2 outputs power corresponding to a vehicle request output according to the vehicle speed VP and the AP opening degree. The series travel mode is selected when the vehicle request output is equal to or greater than a predetermined value or when the vehicle speed VP is equal to or greater than a predetermined value. When the vehicle travels in the engine travel mode, as shown in FIG. 5, the clutch CL is engaged, and the vehicle travels on the power from the engine ENG.

(Control in Series Travel Mode)

Figure 6:
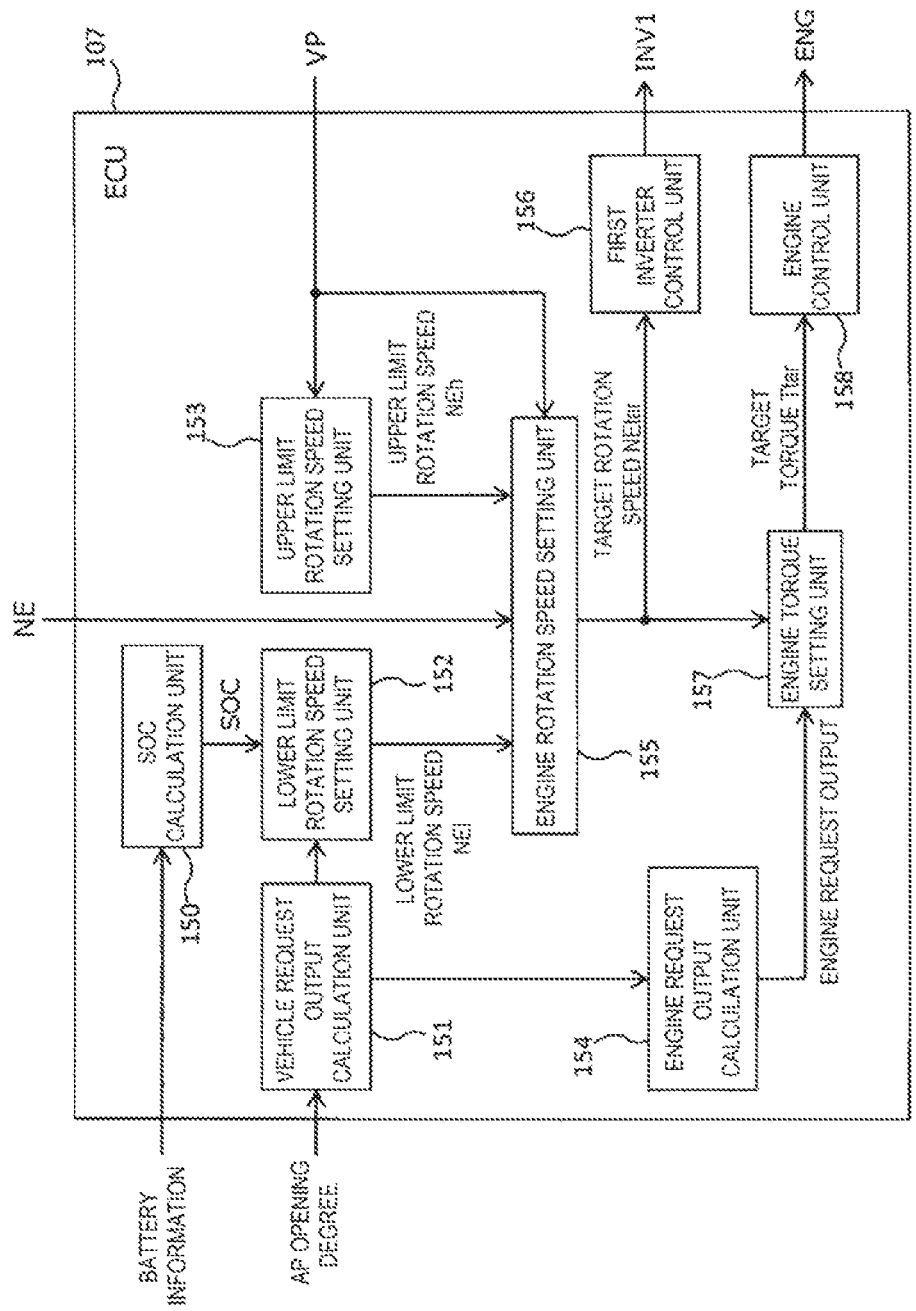
FIG. 6 is a block diagram showing an internal configuration of an ECU that controls the engine and the first motor generator while the vehicle is traveling in the series travel mode.

Control of the engine ENG and the first motor generator MG1 performed by the ECU 107 while the vehicle is traveling in the series travel mode will be described below. FIG. 6 is a block diagram showing an internal configuration of the ECU 107 that controls the engine ENG and the first motor generator MG1 while the vehicle is traveling in the series travel mode.

As shown in FIG. 6, the ECU 107 includes an SOC calculation unit 150, a vehicle request output calculation unit 151, a lower limit rotation speed setting unit 152, an upper limit rotation speed setting unit 153, an engine request output calculation unit 154, an engine rotation speed setting unit 155, a first inverter control unit 156, an engine torque setting unit 157, and an engine control unit 158. Hereinafter, each component included in the ECU 107 will be described.

The SOC calculation unit 150 calculates a state of charge (SOC; also referred to as residual capacity), which is a variable representing the state of charge of the battery BAT by a percentage, based on the battery information obtained from the battery sensor 103. When the SOC is 100%, the battery BAT is in a fully charged state.

The vehicle request output calculation unit 151 calculates the vehicle request output determined from the vehicle speed VP and the AP opening degree.

The lower limit rotation speed setting unit 152 sets a lower limit value NEl of the rotation speed NE of the engine ENG (hereinafter, referred to as "lower limit rotation speed") based on the vehicle request output calculated by the vehicle request output calculation unit 151 and the SOC of the battery BAT calculated by the SOC calculation unit 150. The lower limit rotation speed setting unit 152 sets the lower limit rotation speed NEl to a lower value as the SOC of the battery BAT is higher. This setting decreases a possibility that the first motor generator MG1 generates electricity, and can increase a possibility that the power of the battery BAT having a high SOC is used.

The upper limit rotation speed setting unit 153 sets an upper limit value NEh of the rotation speed NE of the engine ENG (hereinafter, referred to as "upper limit rotation speed") based on the vehicle speed VP. Since a noise level rises and a higher upper limit rotation speed NEh can be allowed as the vehicle speed VP rises, the upper limit rotation speed NEh is set higher as the vehicle speed VP is higher, so that deterioration in marketability due to increase in an operation noise of the engine ENG can be prevented.

The engine request output calculation unit 154 calculates a necessary output of the engine ENG (hereinafter referred to as "engine required output") so that the first motor generator MG1 generates electric power required for the second motor generator MG2 to generate power corresponding to the vehicle request output calculated by the vehicle request output calculation unit 151 while the vehicle is traveling in the series traveling mode (hereinafter, simply referred to as "during the series travel").

The engine rotation speed setting unit 155 sets a target value NEtar of the rotation speed NE of the engine ENG (hereinafter referred to as "target rotation speed") to a value variable between the lower limit rotation speed NEl and the upper limit rotation speed NEh in order to increase or decrease the rotation speed NE of the engine ENG between the lower limit rotation speed NEl and the upper limit rotation speed NEh in accordance with a change in the vehicle speed VP during the series travel. The way to change the target rotation speed NEtar will be described later.

In the series travel mode, the first inverter control unit 156 controls the first inverter INV1 to change a load of the first motor generator MG1, thereby controlling the rotation speed NM1 of the first motor generator MG1, so as to bring the rotation speed NE of the engine ENG linearly corresponding to the rotation speed NM1 of the first motor generator MG1 close to the target rotation speed NEtar.

When the engine ENG is operated with the target rotation speed NEtar set by the engine rotation speed setting unit 155, the engine torque setting unit 157 sets a target value Ttar of the engine torque (hereinafter referred to as "target torque") such that the Output of the engine ENG becomes the engine request output. By the engine torque setting unit 157 setting the target torque Ttar in accordance with the change in the target rotation speed NEtar, the engine ENG outputs the engine request output even when the rotation speed NE changes. By the engine ENG continuously outputting the engine request output, the first motor generator MG1 in the series travel mode can continuously generate electric the electric power consumed by the second motor generator MG2 in accordance with the vehicle request output without surplus or shortage.

The engine control unit 158 performs drive control of the engine ENG to bring the engine torque closer to the target torque Ttar.

Next, the way to change the target rotation speed NEtar of the engine ENG according to the change in the vehicle speed VP during the series travel with the engine rotation speed setting unit 155 of the ECU 107 will be described in detail with reference to FIGS. 7 to 11.

Figure 7:
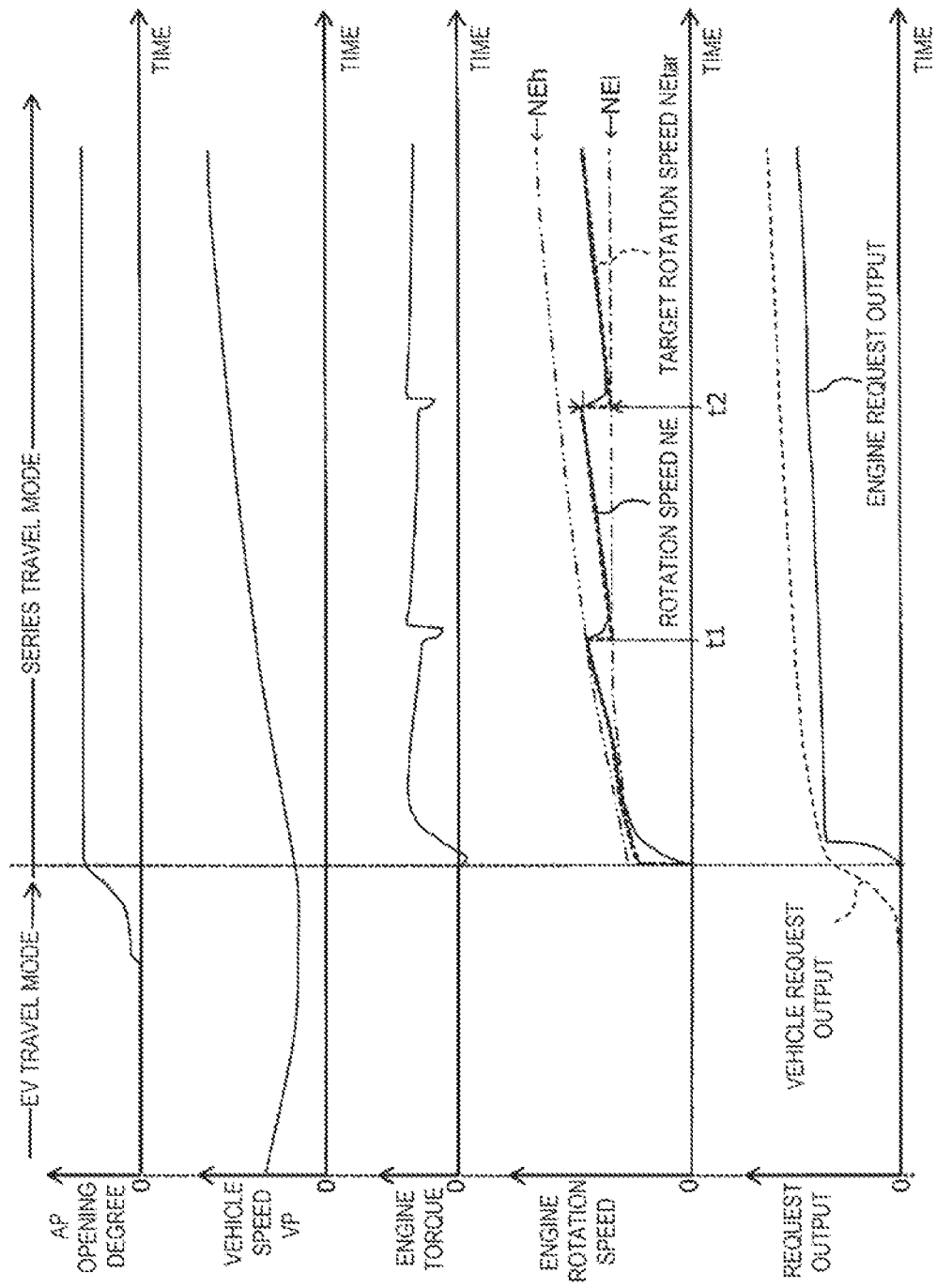
FIG. 7 is a graph showing an example of a temporal change of parameters mainly at the time of series travel including before and after switching from EV travel to series travel.

FIG. 7 is a graph showing an example of a temporal change of parameters mainly at the time of series travel including before and after switching from the EV travel to the series travel. As shown in FIG. 7, when the travel mode of the vehicle is switched from the EV driving mode to the series travel mode, the lower limit rotation speed setting unit 152 sets the lower limit rotation speed NEl, the upper limit rotation speed setting unit 153 sets the upper limit rotation speed NEh, and the engine request output calculation unit 154 calculates the engine request output corresponding to the vehicle request output calculated by the vehicle request output calculation unit 151. The engine rotation speed setting unit 155 sets the target rotation speed NEtar of the engine ENG to the lower limit rotation speed NEl, and then increases the target rotation speed NEtar from the lower limit rotation speed NEl at a predetermined temporal change rate as the vehicle speed VP increases. At this time, as the target rotation speed NEtar increases, the engine torque setting unit 157 sets the target torque Ttar of the engine ENG so as to maintain the output of the engine ENG at the engine request output calculated by the engine request output calculation unit 154. As a result, as shown in FIG. 7, as the rotation speed NE of the engine ENG increases, the engine torque Te decreases.

The engine rotation speed setting unit 155 increases the target rotation speed NEtar from the lower limit rotation speed NEl, and decreases the target rotation speed NEtar to the lower limit rotation speed NEl when the rotation speed NE reaches the upper limit rotation speed NEh as shown at a time t1 in FIG. 7, The engine rotation speed setting unit 155 again increases the target rotation speed NEtar from the lower limit rotation speed NEl at a predetermined temporal change rate as the vehicle speed VP increases. In this way, a simulated gear shift can be realized from the change in the operation noise of the engine ENG by increasing or decreasing the target rotation speed NEtar.

The engine rotation speed setting unit 155 increases the target rotation speed NEtar from the lower limit rotation speed NEl, and decreases the target rotation speed NEtar to the lower limit rotation speed NEl when the rotation speed NE reaches the upper limit rotation speed NEh if a difference between the rotation speed NE and the lower limit rotation speed NEl becomes equal to or greater than a predetermined value, as shown at a time t2 in FIG. 7, In this case, a drop when decreasing the rotation speed NE of the engine ENG can be suppressed to a predetermined value smaller than the difference between the lower limit rotation speed NEl and the upper limit rotation speed NEh, thereby preventing a large change in the operation noise of the engine ENG. If the difference between the lower limit rotation speed NEl and the upper limit rotation speed. NEh is equal to or smaller than a second predetermined value th2 described later, the engine rotation speed setting unit 155 may prohibit a decrease in the target rotation speed NEtar in accordance with a change in the vehicle speed VP during the series traveling. When the difference is small, even when the target rotation speed. NEtar is increased or decreased, the change is felt as a slight variation in the rotation speed NE, that is, a failure of the engine ENG, without being recognized as a change in the rotation speed NE due to the simulated gear shift. Therefore, in a case where the difference is small, the target rotation speed NEtar is prohibited from decreasing and is stuck to the upper limit rotation speed NEh, so that misunderstanding as a failure of the engine ENG can be prevented.

Figure 8:
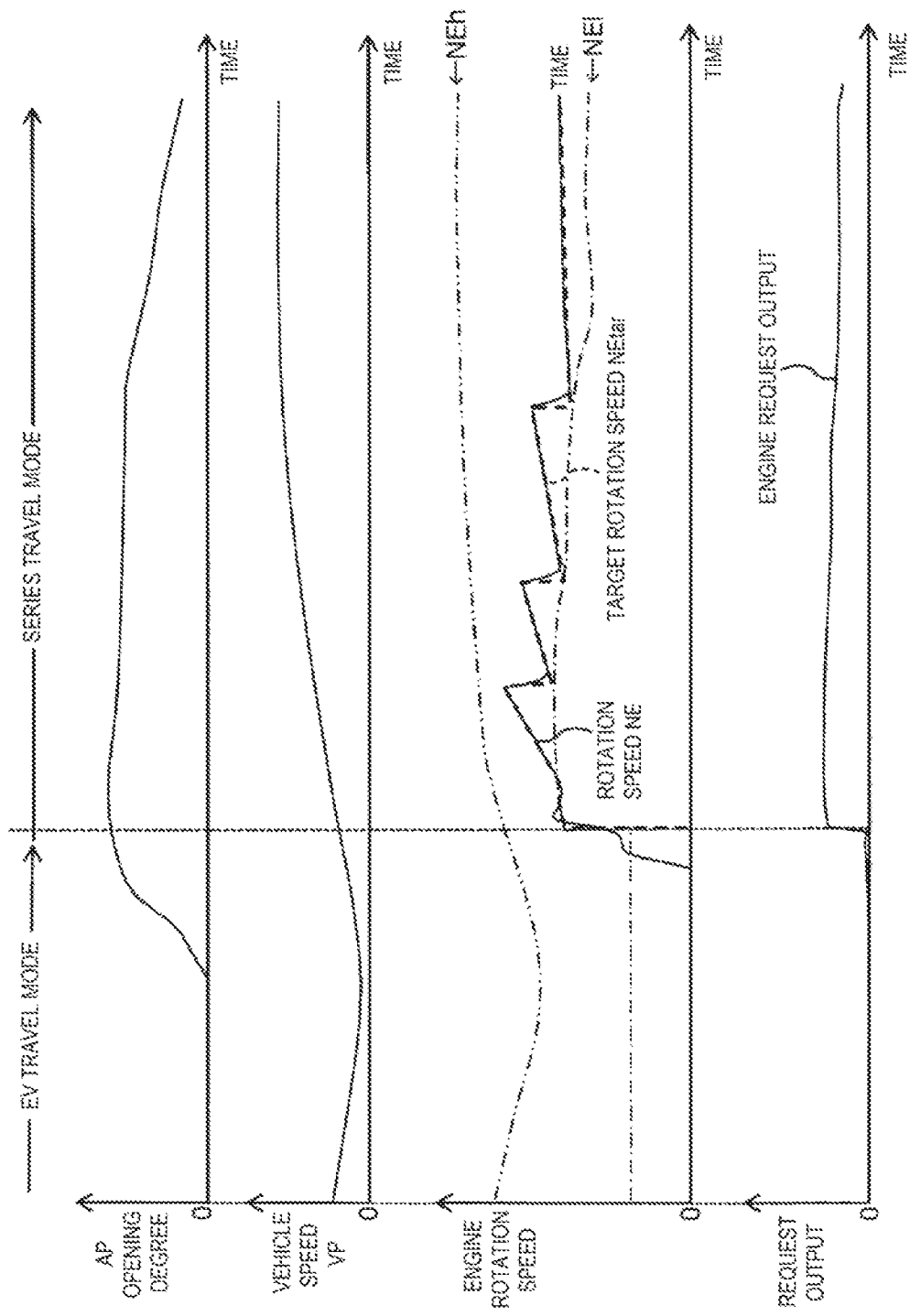
FIG. 8 is another graph showing an example of a temporal change of parameters mainly at the time of series travel including before and after switching from EV travel to series travel.

FIG. 8 is a graph showing another example of a temporal change of parameters mainly at the rime of series travel including before and after switching from the EV travel to the series travel. As described above, in the example shown in FIG. 8, the engine rotation speed setting unit 155 also increases the target rotation speed NEtar of the engine ENG from the lower limit rotation speed NEl as the vehicle speed VP increases. The engine rotation speed setting unit 155 determines an increase rate of the target rotation speed NEtar with respect to the vehicle speed VP when the target rotation speed NEtar is increased from the lower limit rotation speed NEl based on the lower limit rotation speed NEl and the vehicle speed VP.

Figure 9:
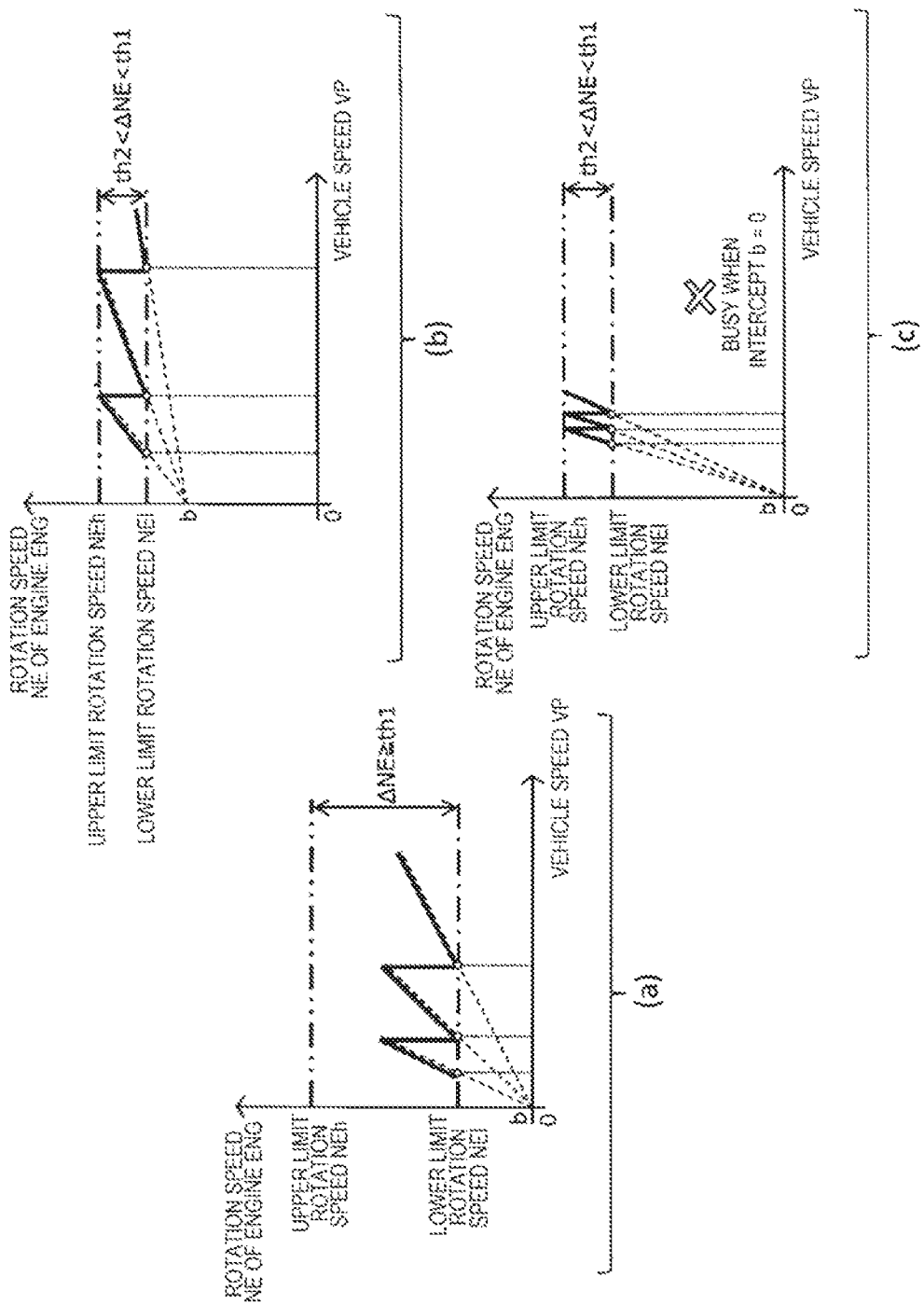
FIG. 9, (a) to (c) are diagrams illustrating a method for determining an increase rate of a target rotation speed with respect to a vehicle speed with an engine rotation speed setting unit.
Figure 10:
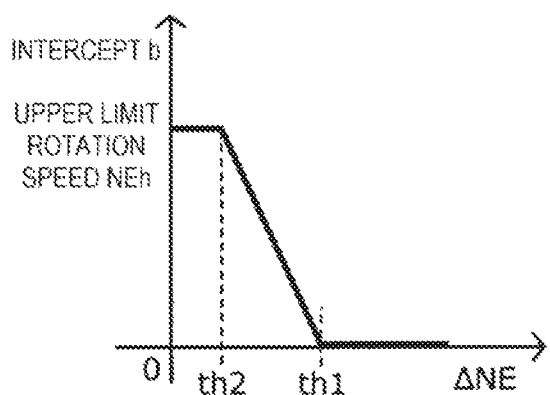
FIG. 10 is a graph showing a relationship between an intercept of a line segment determining a change rate and a difference between the upper limit rotation speed and the lower limit rotation speed.

FIG. 9, (a) to (c) are diagrams illustrating a method for determining the increase rate of the target rotation speed NEtar with respect to the vehicle speed VP with the engine rotation speed setting unit 155. As shown in FIG. 9(*a*) or 9(*b*), the engine rotation speed setting unit 155 determines to the increase rate of the target rotation speed NEtar with respect to the vehicle speed VP as a slope of a line segment connecting an intersection of the vehicle speed VP and the lower limit rotation speed NEl (for example, 0 marks shown in FIG. 9(*a*)) at this time and an intercept b on an axis of the rotation speed NE on a coordinate represented by the rotation speed NE and the vehicle speed VP of the engine ENG. The intercept b is set in accordance with a difference ΔNE between the upper limit rotation speed NEh and the lower limit rotation speed NEl. As shown in FIG. 10, the intercept b is set to a value between zero and the upper limit rotation speed NEh. The intercept h is set to zero if the difference ΔNE is equal to or greater than a first predetermined value th1, is set to a larger value as the difference ΔNE is smaller, and is set to the upper limit rotation speed NEh if the difference ΔNE is equal to or smaller than the second predetermined value th2. The line segment may be obtained using the request output calculated by the vehicle request output calculation unit 151 instead of the lower limit rotation speed NEl.

The example shown in FIG. 9(a) shows a case where the difference ΔNE is equal to or greater than the first predetermined value th1, and the example shown in FIG. 9(h) shows a case where the difference ΔNE is larger than the second predetermined value th2 and smaller than the first predetermined value th1. If the intercept remains zero even when the difference ΔNE is less than the first predetermined value th1, as shown in FIG. 9(c), a setting change, in which the target speed NEtar of the engine ENG is decreased to the lower limit rotation speed NEl since the target rotation speed NEtar has reached the upper limit rotation speed NEh, is frequently performed in a short time. However, in the present embodiment, in a case where the difference ΔNE between the upper limit rotation speed NEh and the lower limit rotation speed NEl is less than the first predetermined value th1, since the intercept b is set to a value higher than zero with the upper limit rotation speed NEh as a maximum value, the setting change can be prevented from frequently occurring. In the following description, the increase rate of the target speed NEtar with respect to the vehicle speed VP determined by the engine rotation speed setting unit 155 is referred to as "predetermined change rate".

The first predetermined value th1 described above is an appropriate differential rotation amount of the upper limit rotation speed NEh and the lower limit rotation speed NEl requested from the simulated gear shift marketability of vehicle, and is a target value of the change amount of the rotation speed NE of the engine ENG in accordance with the change in the vehicle speed VP. When the change amount of the rotation speed NE of the engine ENG falls below the second predetermined value th2, the driver of the vehicle feels the change as a slight variation in the rotation speed NE, that is, a failure of the engine ENG, without recognizing the change as a change in the rotation speed NE due to the simulated gear shift. Therefore, the second predetermined value th2 described above is an allowed lower limit value of the change amount of the rotation speed NE of the engine ENG in accordance with the change in the vehicle speed VP.

Figure 11:
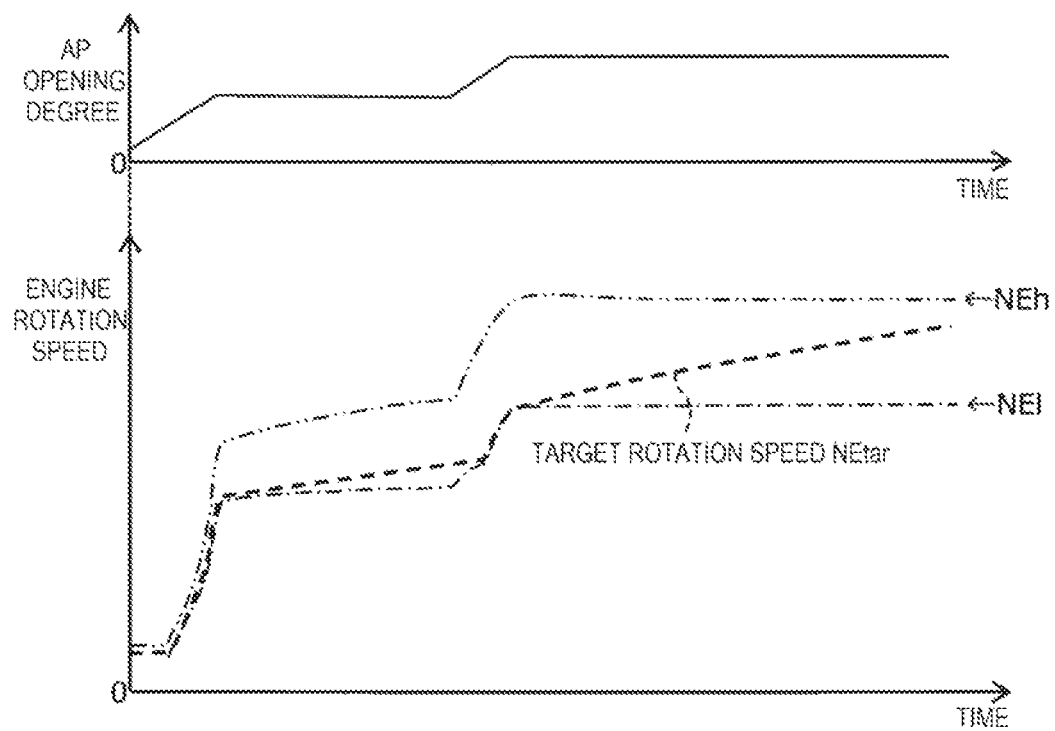
FIG. 11 is a graph showing an example of a temporal change of parameters when an AP opening degree increases during series travel.

FIG. 11 is a graph showing an example of a temporal change of parameters when the AP opening degree increases during the series travel. The example shown in FIG. 11 shows a case where the lower limit rotation speed NEl increases as a result of increase in the AP opening degree during the series travel, and the rotation speed NE of the engine ENG, which is increasing at the predetermined change rate due to the increasing vehicle speed VP, becomes equal to the lower limit rotation speed NEl. In this example, the rotation speed NE will fall below the lower limit rotation speed NEl if the predetermined change rate of the target rotation speed NEtar remains lower than the increase rate of the lower limit rotation speed. NEl. Therefore, the engine rotation speed setting unit 155 increases the target rotation speed NEtar in accordance with the lower limit rotation speed NEl after the rotation speed NE or the target rotation speed NEtar becomes equal to the lower limit rotation speed NEl. Then, if the relationship between the predetermined change rate of the target rotation speed NEtar and the increase rate of the lower limit rotation speed NEl is reversed, the engine rotation speed setting unit 155 increases the target rotation speed NEtar from the lower limit rotation speed NEl at the predetermined change rate as the vehicle speed VP increases. As described above, in a case where the predetermined change rate of the rotation speed NE of the engine ENG is lower than the increase rate of the lower limit rotation speed NEl, since the target rotation speed NEtar is increased in accordance with the lower limit rotation speed NEl, the target rotation speed NEtar does not fall below the lower limit rotation speed NEl, so that the output of the engine ENG can be prevented from decreasing.

Next, the way to change the lower limit rotation speed NEl and the upper limit rotation speed NEh and the way to change the target rotation speed NEtar of the engine ENG in accordance with decrease in the AP opening degree during the series travel will be described in detail with reference to FIG. 12.

Figure 12:
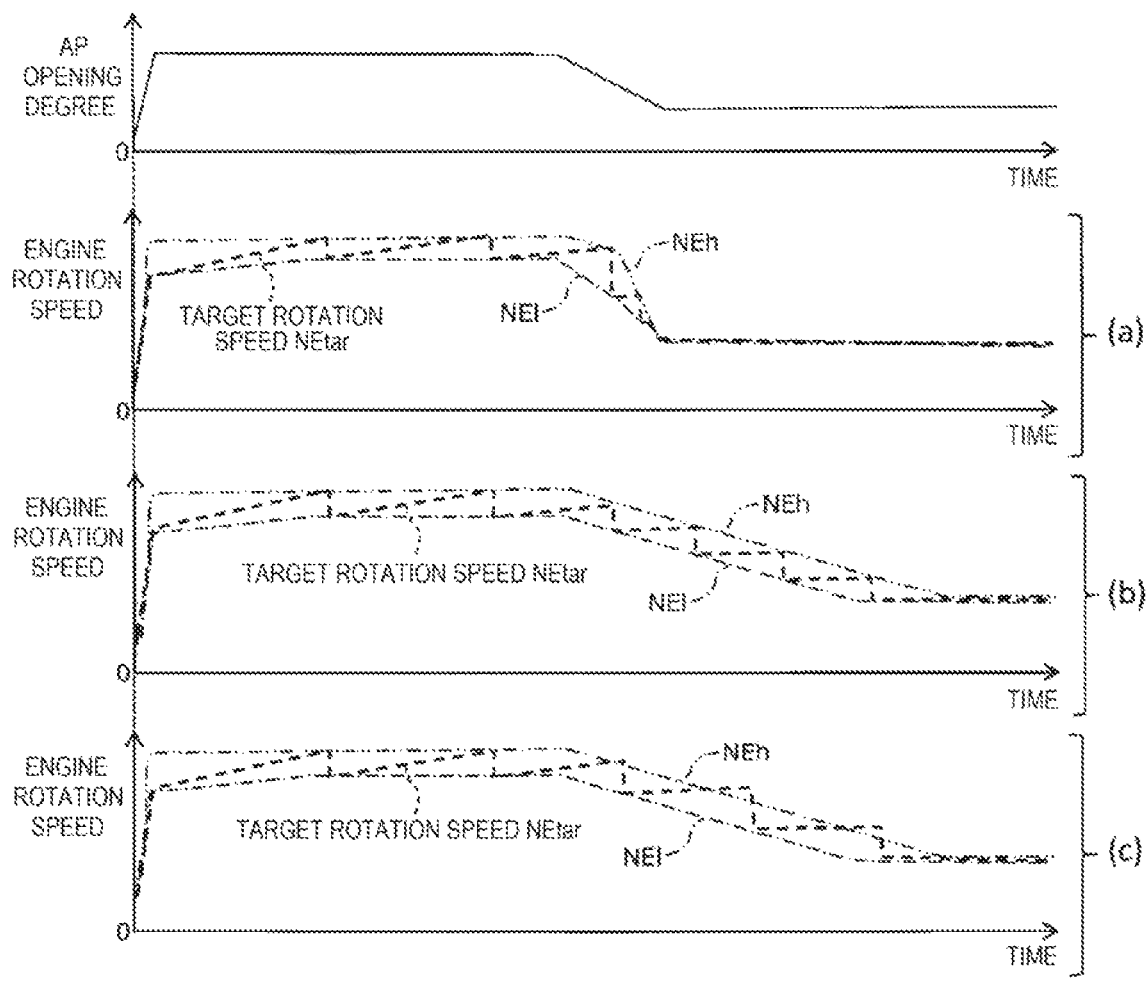
FIG. 12 is a graph showing a plurality of examples of a temporal change of parameters when an AP opening degree decreases during series travel.

FIG. 12 is a graph showing a plurality of examples of a temporal change of parameters when the AP opening degree decreases during the series travel. As shown in (a) of FIG. 12, if the lower limit rotation speed NEl decreases in accordance with a degree of decrease in the AP opening degree and the upper limit rotation speed. NEh decreases in accordance with a decrease in the vehicle speed VP due to the decrease in the AP opening degree, the engine rotation speed setting unit 155 frequently performs a setting change of decreasing the target rotation speed NEtar to the lower limit rotation speed NEl so that the target rotation speed NEtar reaches the upper limit rotation speed NEh (hereinafter, simply referred to as "setting change") in a short time due to a rapid decrease in the lower limit rotation speed NEl and the upper limit rotation speed NEh. Therefore, in the present embodiment, as shown in (b) of FIG. 12, when the AP opening degree is decreased during the series travel, the lower limit rotation speed setting unit 152 decreases the lower limit rotation speed NEl so that a change rate per unit time becomes equal to or smaller than a predetermined value without according to the degree of decrease in the AP opening degree, and the upper limit rotation speed setting unit 153 decreases the upper limit rotation speed NEh so that a change rate per unit time becomes equal to or smaller than a predetermined value without according to decrease of the vehicle speed VP.

As shown in (b) of FIG. 12, when the AP opening degree decreases during the series travel, the lower limit rotation speed NEl and the upper limit rotation speed NEh gradually decrease in the same manner, so that the setting change of the target rotation speed NEtar of the engine ENG takes a longer time than the example shown in (a) of FIG. 12. Therefore, rapid increase or decrease in the rotation speed. NE of the engine ENG can be prevented, and marketability of the vehicle can be improved.

However, the number of times of performing the setting change illustrated in (b) of FIG. 12 is the same as the example shown in (a) of FIG. 12. For this reason, as shown in (c) of FIG. 12, the engine rotation speed setting unit 155 may be configured so as not to perform the setting change unless after a predetermined time has elapsed from a previous setting change in order to increase or decrease the rotation speed NE of the engine ENG at a small number of times in a longer time. In this case, it is possible to prevent frequent increase and decrease of the rotation speed NE of the engine ENG. As a result, responsiveness of the engine ENG at the time of re-acceleration can be prevented from deteriorating.

Figure 13:
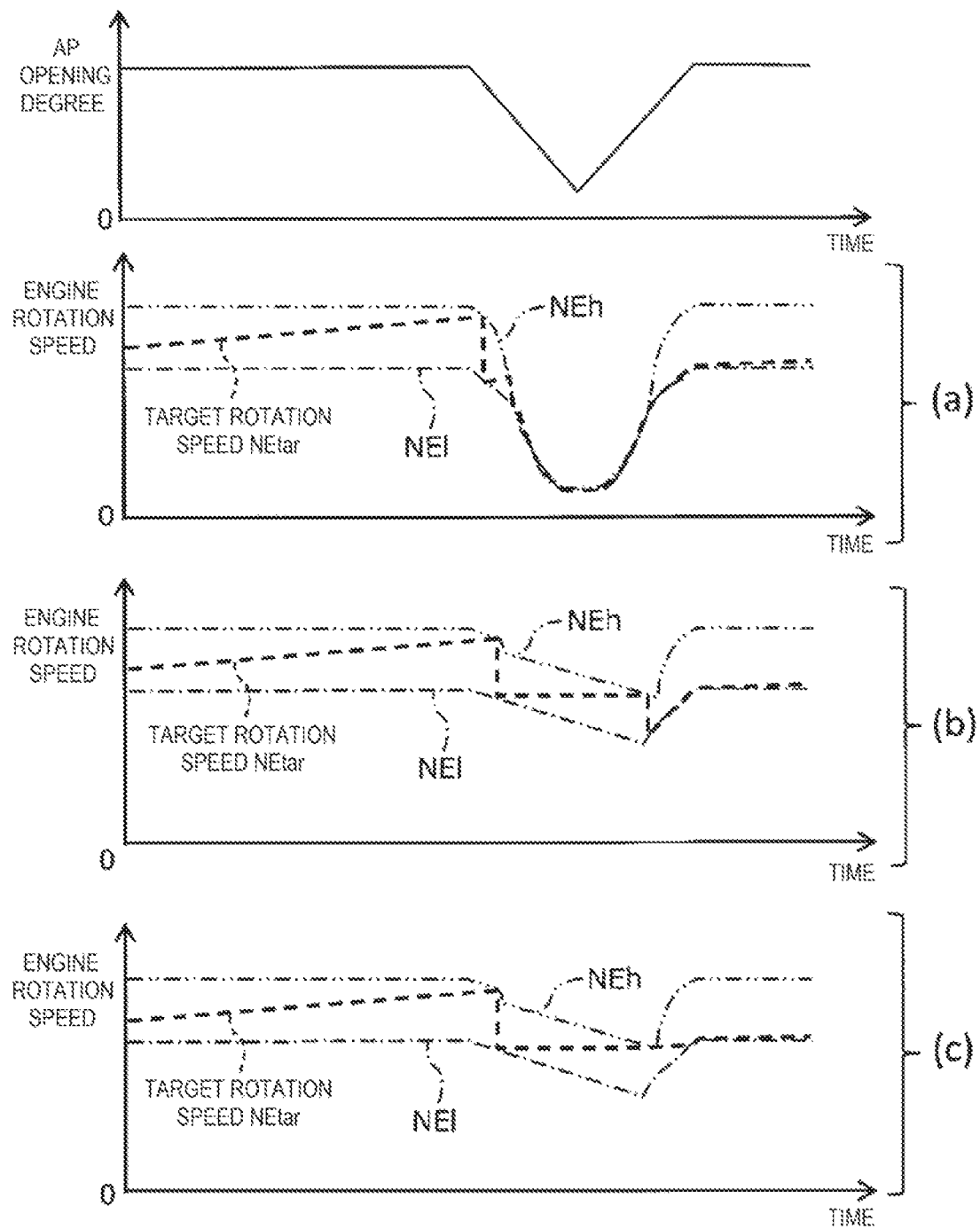
FIG. 13 is a graph showing a plurality of examples of a temporal change of parameters when an AP opening degree temporarily decreases during series travel.

In addition, according to the setting described above with reference to (h) of FIG. 12 or (c) of FIG. 12, when an accelerator pedal operation is performed such that the AP opening degree maintained at a constant value during the series travel is decreased for a short time, for example, 1 second, and then returned to the original value, the target rotation speed NEtar of the engine ENG can be set without conjunction with a temporary decrease of the AP opening degree. FIG. 13 is a graph showing a plurality of examples of a temporal change of parameters when the AP opening degree temporarily decreases during the series travel. The example shown in (a) of FIG. 13 corresponds to the example shown in (a) of FIG. 12, and the target rotation speed NEtar of the engine ENG decreases in conjunction with the AP opening degree, so responsiveness of the engine ENG at the time of re-acceleration deteriorates due to inertia loss. However, as shown in (b) of FIG. 13, according to the setting described with reference to (b) of FIG. 12, even when a temporary decrease occurs to the AP opening degree, a decrease in the target rotation speed NEtar can be prevented, and as shown in (c) of FIG. 13, according to the setting described with reference to (c) of FIG. 12, even when a temporary decrease occurs to the AP opening degree, a decrease in the target rotation speed NEtar can be further prevented.

As described above, according to the present embodiment, by increasing or decreasing the rotation speed NE of the engine ENG between the lower limit rotation speed NEl and the upper limit rotation speed NEh in accordance with the vehicle speed VP, the operation noise of the engine ENG changes in accordance with the vehicle speed VP. In particular, since the rotation speed NE of the engine ENG increases as the vehicle speed VP increases, the driver can obtain a natural feeling in which the vehicle speed VP and the operation noise of the engine ENG are in conjunction with each other, thereby improving marketability of the vehicle. In addition, the power of the engine ENG or the output of the first motor generator MG1 capable of providing the electric power required for the second motor generator MG2 does not change due to the setting change of the target torque Ttar even when the rotation speed of the engine ENG is increased or decreased. Therefore, the power can be supplied to the second motor generator MG2 without surplus or shortage, without transmitting electric power to and receiving electric power from the battery BAT. In this way, unnecessary energy conversion or the like is not generated, and thus energy efficiency is improved. As described above, it is possible to achieve both improvement of marketability of the vehicle and improvement of energy efficiency.

Figure 14:
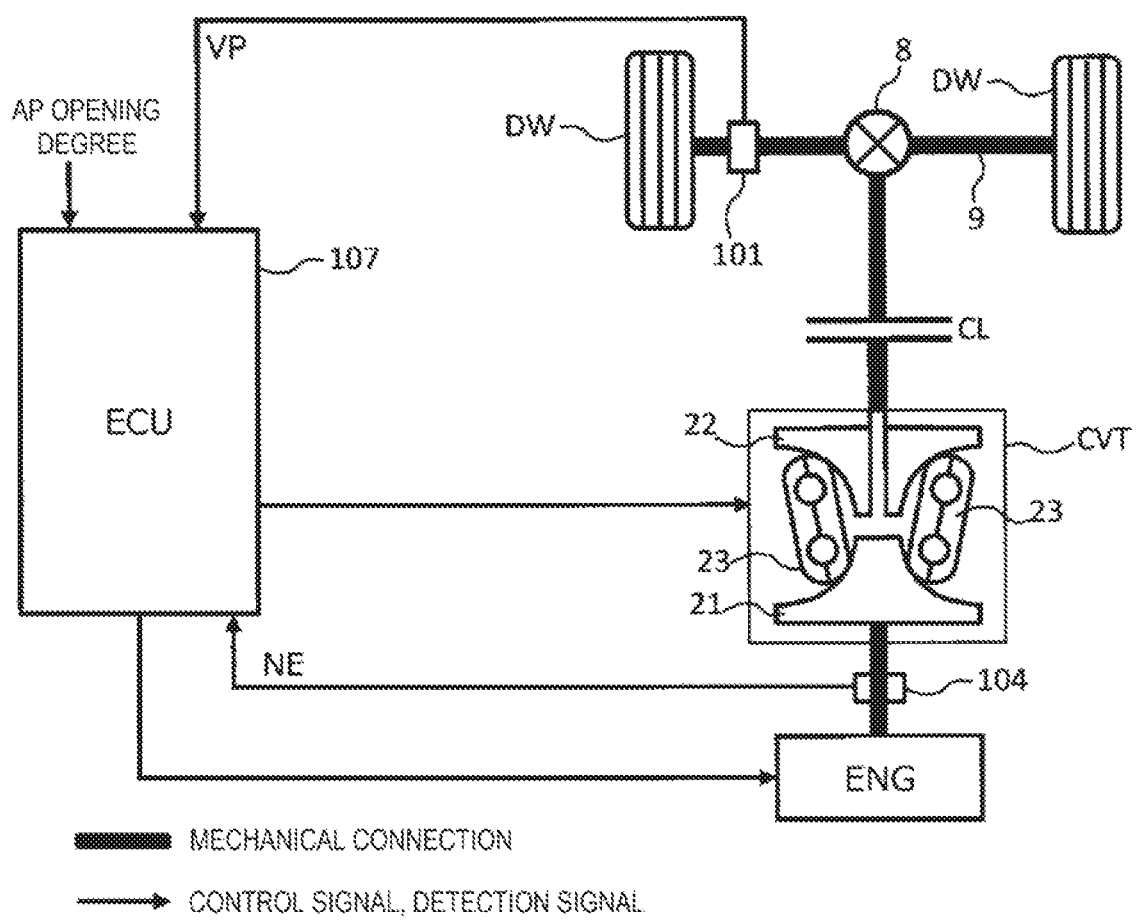
FIG. 14 is a block diagram showing an internal configuration of a vehicle having an engine and a continuously variable speed changer.

Incidentally, the present invention is not limited to the above-described embodiment and may be appropriately modified, improved, or the like. For example, in the vehicle having the engine ENG and the continuously variable speed changer CVT shown in FIG. 14, the rotation speed NE of the engine ENG is increased or decreased between the lower limit rotation speed NEl and the upper limit rotation speed NEh in accordance with the change in the vehicle speed VP, and the gear ratio in the continuously variable speed changer CVT is changed in accordance with the change in the rotation speed NE. As a result, even when the rotation speed NE changes, the engine ENG outputs the engine request output according to the AP opening degree, and an output corresponding to the AP opening degree is transmitted to the drive wheels DW, DW. Although a toroidal continuously variable speed changer CVT having an input disk 21, an output disk 22, and a power roller 23 is shown in FIG. 14, a winding type continuously variable speed changer having a driven pulley, a drive pulley, and a belt may be used as well.

REFERENCE SIGNS LIST

101 Vehicle speed sensor
103 Battery sensor
104 Rotation speed sensor
105 VCU
107 ECU
150 SOC calculation unit
151 Vehicle request output calculation unit
152 Lower limit rotation speed setting unit
153 Upper limit rotation speed setting unit
154 Engine request output calculation unit
155 Engine rotation speed setting unit
156 First inverter control unit
157 Engine torque setting unit
158 Engine control unit
BAT Battery
CL Lockup clutch
ENG Engine
GB Gear box
INV1 First inverter
INV2 Second inverter
MG1 First motor generator
MG2 Second motor generator

The invention claimed is:

1. A vehicle control device having a prime mover, a first rotating member configured to be rotated by power of the prime mover, and a second rotating member connected to the first rotating member and configured to rotate a drive wheel, comprising:
    a deriving unit configured to derive a prime mover request output that is an output requested by the prime mover in accordance with a request output to the drive wheel; and
    a control unit configured to increase or decrease a rotation speed of the prime mover between a lower limit rotation speed and an upper limit rotation speed in accordance with a change in a rotation speed of the drive wheel,
    wherein the control unit is configured to increase or decrease the rotation speed of the prime mover without changing a power output by the prime mover or an output of the first rotating member in accordance with the prime mover request output.

2. The vehicle control device according to claim 1, wherein the control unit is configured to increase the rotation speed of the prime mover as the rotation speed of the drive wheel increases.

3. The vehicle control device according to claim 2, wherein the control unit is configured to determine an increase rate of the rotation speed of the prime mover with respect to the rotation speed of the drive wheel based on the lower limit rotation speed and the rotation speed of the drive wheel.

4. The vehicle control device according to claim 3, wherein the increase ratio is equal to a slope of a line segment connecting an intersection of the rotation speed of the drive wheel and the lower limit rotation speed and an intercept on an axis of the rotation speed of the prime mover on a coordinate represented by the rotation speed of the prime mover and the rotation speed of the drive wheel.

5. The vehicle control device according to claim 4, wherein the intercept is set in accordance with a difference between the upper limit rotation speed and the lower limit rotation speed.

6. The vehicle control device according to claim 5, wherein the intercept is set to zero when the difference is equal to or greater than a first predetermined value.

7. The vehicle control device according to claim 5 or 6, wherein the intercept is set to a larger value as the difference is smaller.

8. A vehicle control device according to claim 5, wherein the intercept is set to the upper limit rotation speed when the difference is equal to or smaller than a second predetermined value.

9. A vehicle control device according to claim 1, wherein when the rotation speed of the prime mover reaches the upper limit rotation speed, the control unit decreases a target rotation speed of the prime mover to a predetermined value between the lower limit rotation speed and the upper limit rotation speed.

10. The vehicle control device according to claim 9, wherein the predetermined value is the lower limit rotation speed.

11. The vehicle control device according to claim 1, wherein when the difference between the lower limit rotation speed and the upper limit rotation speed is equal to or smaller than a predetermined value, the control unit prohibits a decrease in the rotation speed of the prime mover.

12. The vehicle control device according to claim 1, wherein when a difference between the rotation speed of the prime mover and the lower limit rotation speed is equal to or greater than a predetermined value before the rotation speed of the prime mover reaches the upper limit rotation speed, the control unit reduces the target rotation speed of the prime mover to the lower limit rotation speed.

13. The vehicle control device according to claim 2, wherein when the rotation speed of the drive wheel increases, in a case where the increase rate of the rotation speed of the prime mover with respect to the rotation speed of the drive wheel is lower than an increase rate of the lower limit rotation speed, the control unit increases the rotation speed of the prime mover in accordance with the lower limit rotation speed after the rotation speed of the prime mover becomes equal to the lower limit rotation speed.

14. The vehicle control device according to claim 1, wherein the control unit is configured to:
set the lower limit rotation speed in accordance with the request output, and
when the lower limit rotation speed is to be decreased in accordance with a decrease in the request output, set a decrease rate of the lower limit rotation speed equal to or smaller than a predetermined value.

15. The vehicle control device according to claim 1, wherein the control unit sets the upper limit rotation speed in accordance with the rotation speed of the drive wheel.

16. The vehicle control device according to claim 15, wherein when the upper limit rotation speed is to be decreased in accordance with a decrease in the rotation speed of the drive wheel, the control unit sets a decrease rate of the upper limit rotation speed equal to or smaller than a predetermined value.

17. The vehicle control device according to claim 9, wherein in a case where the rotation speed of the prime mover has reached the upper limit rotation speed and thus the target rotation speed of the prime mover is to be decreased, the control unit decreases the target rotation speed after a predetermined time has elapsed since a previous decrease of the target rotation speed.

18. The vehicle control device according to claim 1, wherein when the request output is equal to or greater than a predetermined value or the rotation speed of the drive wheel is equal to or greater than a predetermined value, the control unit increases or decreases the rotation speed of the prime mover between the lower limit rotation speed and the upper limit rotation speed.

19. The vehicle control device according to claim 1, wherein the first rotating member is a generator and the second rotating member is an electric motor.

20. The vehicle control device according to claim 19, wherein the vehicle includes a capacitor capable of supplying electric power to the second rotating member and charging electric power generated by the first rotating member, and
wherein the control unit sets the lower limit rotation speed to be lower as a remaining capacity of the capacitor is higher.

21. The vehicle control device according to claim 1, wherein the first rotating member is an input-side member of a continuously variable speed changer, and the second rotating member is an output-side member of the continuously variable speed changer.

* * * * *